United States Patent

Martin et al.

[11] Patent Number: 5,190,494
[45] Date of Patent: Mar. 2, 1993

[54] POULTRY SCALDER

[75] Inventors: Eugene E. Martin, Denver, Pa.;
Edward H. Covell, III, 919 Riverside Dr., Salisbury, Md. 21801

[73] Assignee: Edward H. Covell, III, Salisbury, Md.

[21] Appl. No.: 822,961

[22] Filed: Jan. 21, 1992

[51] Int. Cl.⁵ .............................. A22B 5/08
[52] U.S. Cl. .............................. 452/80; 452/78
[58] Field of Search ............ 452/80, 74, 75–79

[56] References Cited

U.S. PATENT DOCUMENTS

| | | | |
|---|---|---|---|
| 1,668,039 | 5/1928 | Allen | 452/80 |
| 1,672,555 | 6/1928 | Barker et al. | 452/80 |
| 1,770,565 | 7/1930 | Anderson | 452/80 |
| 2,001,813 | 5/1935 | Bouda | 452/80 |
| 2,412,338 | 12/1946 | Jasper | 452/80 |
| 2,700,792 | 2/1955 | Adams et al. | 452/80 |
| 2,732,583 | 1/1956 | Van Dolah | 452/78 |
| 2,810,927 | 10/1957 | Adams et al. | 452/78 |
| 2,879,540 | 3/1959 | Van Ness | 452/78 |
| 3,103,697 | 9/1963 | Almquist | 452/80 |
| 3,748,691 | 7/1973 | Snowden | 452/78 |
| 4,566,151 | 1/1986 | Warren | 452/80 |
| 4,852,215 | 8/1989 | Covell, III | 452/80 |
| 4,944,068 | 7/1990 | Covell, III | 452/80 |
| 4,947,518 | 8/1990 | Covell, III | 452/80 |
| 4,996,741 | 3/1991 | Covell, III | 452/74 |

FOREIGN PATENT DOCUMENTS 16205  4/1985  Japan .................. 452/80

Primary Examiner—Willis Little
Attorney, Agent, or Firm—Shoemaker and Mattare, Ltd.

[57] ABSTRACT

A poultry scalding tank has one wall with a lateral pocket that receives the breast of the bird suspended by the feet from a shackle conveyor running above the tank. The top of the pocket produces a force normal to the breast upon contact, which force has a downward component sufficient to overcome buoyancy forces that tend to raise portions of the bird out of the water. A more thorough and even scalding results.

7 Claims, 2 Drawing Sheets

POULTRY SCALDER

This invention relates to butchering, particularly to an apparatus for scalding poultry.

BACKGROUND OF THE INVENTION

After a chicken or other bird is slaughtered in a processing plant, it is carried by a leg shackle conveyor through a scalding bath, containing water at a temperature of about 128° F. to 140° F., to loosen the feathers prior to plucking. The immersion time is kept to the minimum necessary to loosen all the feathers, so as not to cook the outer layers of the bird, which can alter its color, among other effects. However, the feathers and anatomical irregularities both interfere with water flow around the bird and hence heat transfer, so that non-uniform scalding results. Two problem areas are around the tail, and the backs of the wings. To loosen the feathers sufficiently in the most difficult areas, it is necessary to keep the bird in the bath longer than is necessary for the better exposed areas.

In an effort to improve heat transfer, and thus reduce scalding time, it is common to agitate the water around the bird, for example by injecting hot air into the scalding tank below the conveyor line. One example of this technique is described in U.S. Pat. No. 4,566,151. When the bird is immersed in the bath, its buoyancy tends to bring it to the surface, so that part of the bird (for example, the problematic tail area) is out of contact with the hot water. Air injection has been found to aggravate the buoyancy problem.

Whenever buoyancy causes incomplete scalding, rejection of the bird, or extensive hand picking, may follow. Therefore, the buoyancy problem has been addressed previously, in a number of ways, including: (a) using a low-density scalding fluid like steam or hot air; (b) using water sprays instead of immersion—see, e.g., U.S. Pat. No. 2,412,338; (c) generating localized downward currents in a water bath sufficient to overcome buoyancy—U.S. Pat. No. 3,879,540; and (d) providing some sort of mechanical restrain above the bird. Mechanical devices previously used include rails at the surface of the bath, between which the feet of the bird pass. One such use is shown in U.S. Pat. No. 3,103,697. Techniques (c) and (d) are combined in U.S. Pat. No. 1,672,555.

A problem with physical restraints is that they generally constitute separate parts adding to the cost of the tank and requiring additional cleaning and service; they also obstruct service access to the inside of the tank. Furthermore, physical restraints above the tank provide an unnecessary opportunity for obstructing conveyors and other automated equipment. For these reasons, it would be preferable to have a scalding tank whose top was completely open, free of any obstruction.

SUMMARY OF THE INVENTION

An object of this invention is to prevent birds from floating up in a scalding bath, that is, to keep their feathered portions fully submerged, without obstructing the top of the bath with a physical barrier.

Related objects are to reduce reject rates, to minimize tedious hand picking, and to shorten the scalding time.

A further object is to simplify the design of a scalding tank, so as to reduce its construction and maintenance costs.

These and other objects of the invention are met by a scalding tank in the form of an elongate channel, one side wall of which does not contact birds passed through the tank; the other side is contoured to engage the breast of each bird from above, so as to keep the bird fully submerged. The contour of the working side wall also is designed to provide clearance for the leg. The conveyor plane is offset toward the working side wall, to create the necessary breast contact with the contoured wall.

DESCRIPTION OF THE PREFERRED EMBODIMENT

Figure 1:
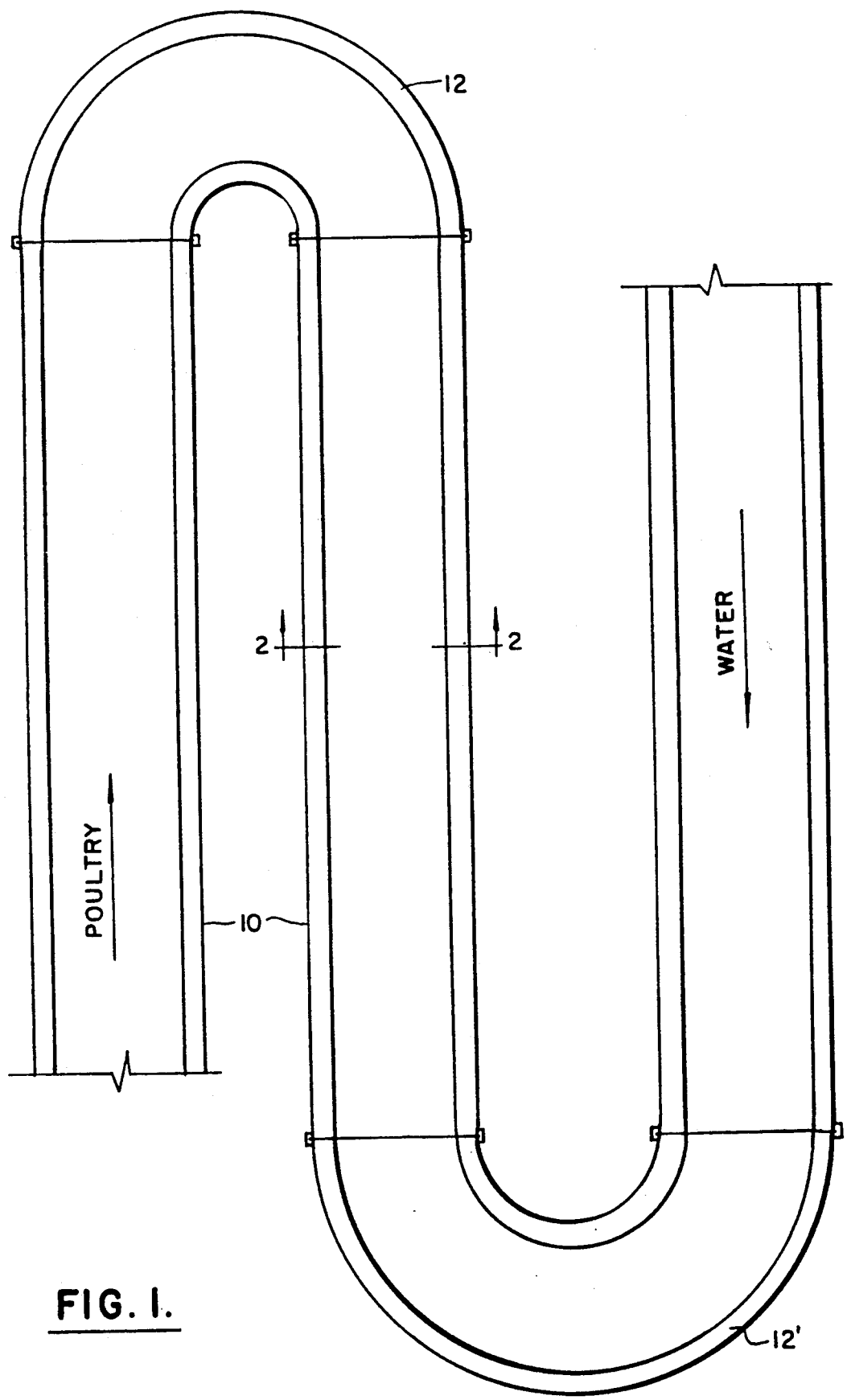
FIG. 1 is a top plan view of scalding tank constructed according to the invention.

As shown in FIG. 1, a scalding tank constructed according to the invention comprises a plurality of straight troughs or channels 10, interconnected by arcuate channel sections 12, 12' in a serpentine arrangement. The particular geometry of the serpentine path is not important to this invention, and in fact a path of any shape can be used. The geometry chosen will usually depend on plant layout. The difference between the arcuate sections indicated by numeral 12 and those by 12' is that the former have a smaller radius of curvature. This results from the asymmetrical cross-sectional trough shape shown in the drawings and described below.

Figure 2:
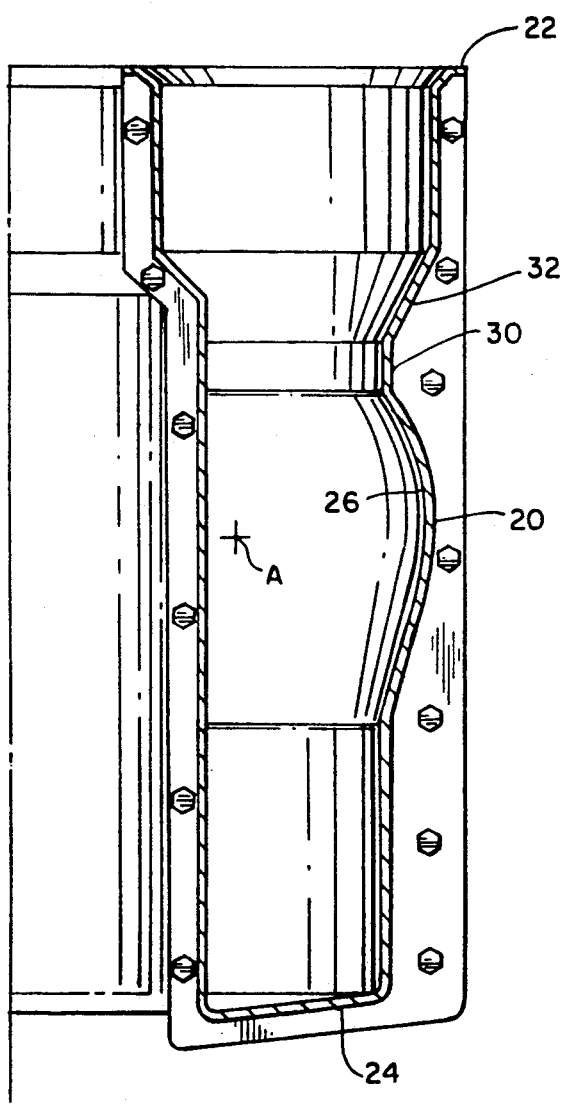
FIG. 2 is a sectional view of the invention, taken along the vertical plane 2—3 of FIG. 1, showing part of a curved section in the background; and FIG. is a view similar to FIG. 2, but with background removed for clarity, showing also a conveyor supporting a chicken and its relationship to the tank.
Figure 3:
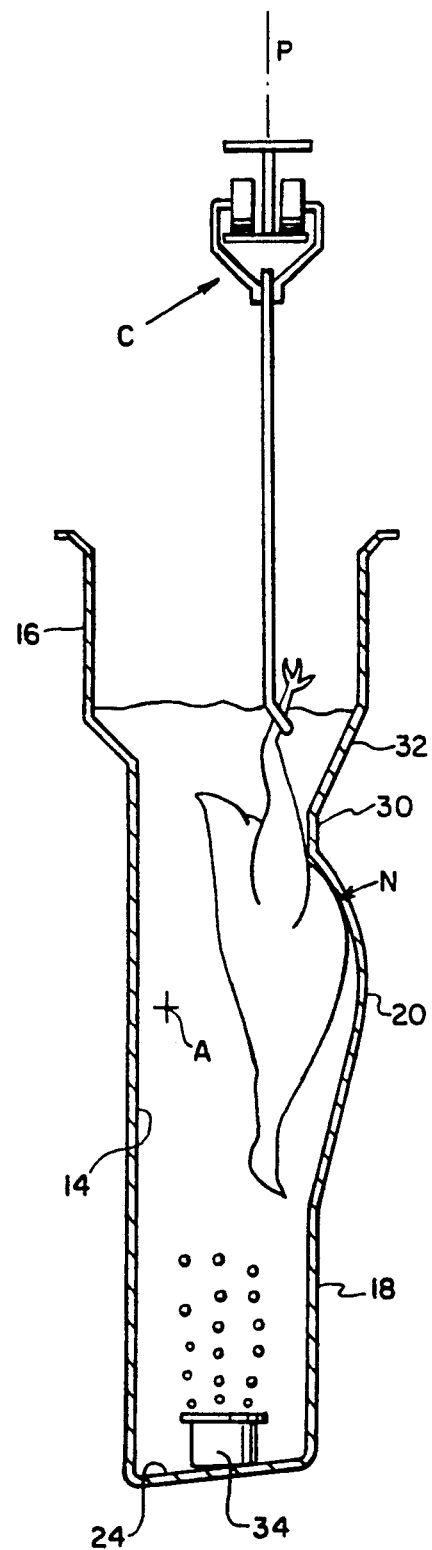

The trough has a substantially uniform cross-section over its entire length. A representative cross-section is illustrated in FIGS. 2 and 3. As evident from FIG. 3, each trough is offset or shifted laterally in one direction with respect to the center plane P of the shackle conveyor C above it. The bird does not contact the "far" side wall 14 more remote from the plane P; hence, that wall is substantially vertical and smooth, except for the offset portion 16 near the top, which is provided only to improve the strength of the trough. Additional ribs or other reinforcement may be provided if necessary.

The "near" side wall 18 of the trough is not planar; rather, it is characterized by an outward bulge 20 intermediate the top 22 and bottom 24 of the trough, forming a pocket 26 at a level corresponding to the breast of the bird. In practice, one can raise or lower the tank, or the conveyor, to establish proper registration between the breast location and the pocket. The tank may be provided with feet, not shown, to provide for such adjustment.

The inner surface of the pocket 26 is preferably a segment of a cylindrical surface whose axis A extends horizontally through the tank. In the tank presently preferred for scalding chickens, the axis A is about 19.25 inches from the top of the tank, and the pocket has an inside radius of about 7.875 inches. At least a portion of the pocket lies higher than its axis A; it is that portion of the pocket above the axis which, sloping upwardly and inwardly, performs the function of keeping the bird down in the scalding tank. As the shackle conveyor keeps the breast in contact with this segment, there is a resulting normal N force impressed upon the bird, which has a downward component sufficient to overcome the buoyancy of the bird in the bath.

The pocket 26 is immediately bounded above by a short vertical wall segment 30 that runs parallel to the legs of the bird; an oblique segment 32, above the segment 30, opens outwardly toward the top of the tank, to clear the birds' feet and avoid any interference at that point.

On the bottom or floor 24 of the trough, an air injector 34, shown only in FIG. 3, emits bubbles that rise around the bird, and create turbulence in the water which helps penetrate the feather layer and produce more uniform heat transfer. Such devices are well known; accordingly, details of the air injector are not shown or described. The floor 24 is tilted to one side, as shown, to prevent pooling of water when the tank is emptied for cleaning.

In operation, a series of birds are loaded into the shackle conveyor so that the birds are aligned the same way, with their breasts oriented toward the near wall 18, as shown in FIG. 3. The conveyor is moved continuously and at constant speed by a suitable drive mechanism, not shown, carrying the birds along the length of the scalding tank. Hot water introduced into the downstream end of the tank flows toward an outlet at the upstream end. The resulting counterflow applies the hottest, cleanest water to each bird just before it exits from the bath.

Beneath the birds, for all or part of the length of the trough, the air injectors agitate the scalding water to improve heat transfer. The breast of each bird remains engaged by the upper portion of the pocket 26, keeping the bird down in the water so that all portions, especially the tail, remain in contact with the water.

As a result, full scalding of each bird is assured, without the costs, dangers or inconvenience of prior mechanical restraints used to prevent birds from floating in a scalding tank.

It should be understood that the particular geometry and dimensions described above for the pocket are only those presently preferred, and are presented as the best mode now contemplated for carrying out this invention. It is expected that variations on this geometry may prove workable, or even superior. What is important is that that portion of the near wall in contact with the birds' breasts face the birds obliquely downward. The pocket need not necessarily be a cylindrical segment. It could have another curved shape, or be formed from straight segments. The shape proposed is more easily cleaned that would be one with sharp corners.

Inasmuch as the invention is subject to many modifications and variations, it is intended that the foregoing shall be interpreted as merely illustrative of the invention defined by the following claims.

I claim:

1. An apparatus for scalding poultry, comprising
   a shackle conveyor for moving a series of slaughtered birds along a predetermined path,
   an elongate tank for containing scalding water, disposed below said conveyor and configured to follow said path, said tank having an unobstructed, open top and two side walls, at least one of said walls having an inwardly and upwardly inclined portion even with the breasts of the birds, and
   said conveyor being situated sufficiently close to said inwardly inclined wall portion, laterally, to keep the breasts in contact therewith, whereby a normal force developed between said inwardly inclined wall portion and the breast has a downward component sufficient to overcome any buoyancy forces that would otherwise raise portions of the birds out of the water.

2. The invention of claim 2, wherein said elongate tank comprises a series of interconnected tank sections.

3. The invention of claim 3, wherein said tank sections comprise straight and arcuate sections following a serpentine path.

4. The invention of claim 3, wherein each of said sections has end flanges, and each pair of adjacent sections in said series is bolted together, flange-to-flange.

5. The invention of claim 1, wherein said inwardly inclined wall portion is part of a pocket having an inner surface which is the segment of a cylinder whose axis is horizontal and extends within and lengthwise of the tank, said inwardly and upwardly inclined portion being that portion of the pocket lying higher than said axis.

6. An tank for scalding poultry, comprising
   said tank having an unobstructed, open top and two side walls, at least one of said walls having an inwardly and upwardly inclined portion even with the breasts of the birds, whereby when a series of birds are conveyed through said tank with their breasts in sliding contact with the inclined portion, a normal force is developed between said inwardly inclined wall portion and the breast, said force having a downward component sufficient to prevent the bird from floating in the tank.

7. The invention of claim 6, wherein said inwardly inclined wall portion is part of a pocket having an inner surface which is a segment of a cylinder whose axis is horizontal and extends within and lengthwise of the tank, said inwardly and upwardly inclined portion being that portion of the pocket lying higher than said axis.

* * * * *